United States Patent [19]

Forest

[11] Patent Number: 5,227,816
[45] Date of Patent: Jul. 13, 1993

[54] AUTOMATIC DOCUMENT HANDLER SEQUENCING BY INTERRUPTING ADH OPERATION WHEN ONLY A PREDETERMINED NUMBER OF ORIGINALS REMAIN

[75] Inventor: Paul H. Forest, Rochester, N.Y.

[73] Assignee: Eastman Kodak Company, Rochester, N.Y.

[21] Appl. No.: 632,678

[22] Filed: Dec. 24, 1990

[51] Int. Cl.⁵ .................................................. G03G 21/00
[52] U.S. Cl. ...................................... 346/160; 271/256; 271/258; 355/308; 355/309
[58] Field of Search ............... 355/308, 313, 314, 320, 355/325; 271/3.1, 4, 10, 256, 258, 110, 157, 3; 346/160

[56] References Cited

U.S. PATENT DOCUMENTS

| | | | |
|---|---|---|---|
| 803,582 | 11/1905 | Gustafson | 271/157 |
| 4,585,221 | 4/1986 | Lillibridge | 271/10 |
| 4,589,645 | 5/1986 | Tracy | 271/3.1 |
| 4,815,725 | 3/1989 | Kanaya | 271/258 |
| 4,843,428 | 6/1989 | Sugiura et al. | 355/202 X |
| 4,928,949 | 5/1990 | Ramsey et al. | 271/258 X |
| 4,976,421 | 12/1990 | Kanaya | 271/157 |
| 5,028,041 | 7/1991 | Kobayashi | 271/258 X |
| 5,078,379 | 1/1992 | Leisner | 271/3.1 |

Primary Examiner—R. L. Moses
Assistant Examiner—J. E. Barlow, Jr.
Attorney, Agent, or Firm—David A. Howley

[57] ABSTRACT

A document copier having an automatic document handler is able to process jobs whose number of document sheets exceed the capacity of the document feeder by including control to stop feeding sheets whenever there is less than a predetermined minimum number greater, than one, of unfed sheets remaining, so that an operator can add more sheets of the same job. Feeding can be reinitiating after the automatic document handler has been stopped, and the stopping feature can be selectively disabled so that all received sheets are fed by the automatic document handler without stopping. Generally, the document feeder will be used with a job processor which treats the last sheet in a received stack, and all preceding sheets, as a job.

8 Claims, 6 Drawing Sheets

AUTOMATIC DOCUMENT HANDLER SEQUENCING BY INTERRUPTING ADH OPERATION WHEN ONLY A PREDETERMINED NUMBER OF ORIGINALS REMAIN

BACKGROUND OF THE INVENTION

1. Technical Field

This invention relates generally to automatic document handlers for feeding document sheets seriatim to a device such as the exposure platen of a document copier, and more particularly to an apparatus and method for permitting the handling of jobs that exceed the sheet capacity of the document handler's supply or input tray.

2. Background Art

Automatic document handlers such as those used in document copiers and the like generally have supply or input trays adapted to receive a stack of document sheets, and to feed the document sheets seriatim to a device such as the platen of a copy machine. The device is often adapted to treat a stack of original documents as a job; often performing job-related functions to the product.

For example, a device may be programmed to perform certain functions on a job-level basis. That is, a copier may be set up to effect collation, image reversal, image shift, magnification, copy paper selection, folding, stapling, color modes, image enhancement, pamphlets, or the like for the entire job.

Many prior art devices define a job by the stack of document sheets in supply or input tray. When the last sheet is fed, an end of job signal is generated.

Because there is a physical limit to the number of document sheets that can be loaded into many automatic document feeders, there exists a problem that the number of documents in a job cannot exceed the capacity of the automatic document feeder.

DISCLOSURE OF INVENTION

It is an object of the present invention to provide a device, of the type having an automatic document handler which denotes the last sheet in the supply or input tray as the last sheet of a job, with the capability of receiving jobs whose number of document sheets exceed the capacity of the document feeder.

Accordingly to this and other objects, the present invention includes an automatic document handler adapted to receive a predetermined maximum number of document sheets and to feed received sheets seriatim. The automatic document handler is caused to stop feeding sheets whenever there is less than a predetermined minimum number greater, than one, of unfed sheets remaining so that an operator can add more sheets of the same job.

In a preferred embodiment, feeding can be reinitiating after the automatic document handler has been stopped. Also, the stopping feature can be selectively disabled so that all received sheets are fed by the automatic document handler without stopping. Generally, the document feeder will be used with a job processor which treats the last sheet in a received stack, and all preceding sheets, as a job. A preferred use for the apparatus is in a document copier having a copy finisher which operates on complete copy sets of a multisheet original document.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Figure 1:
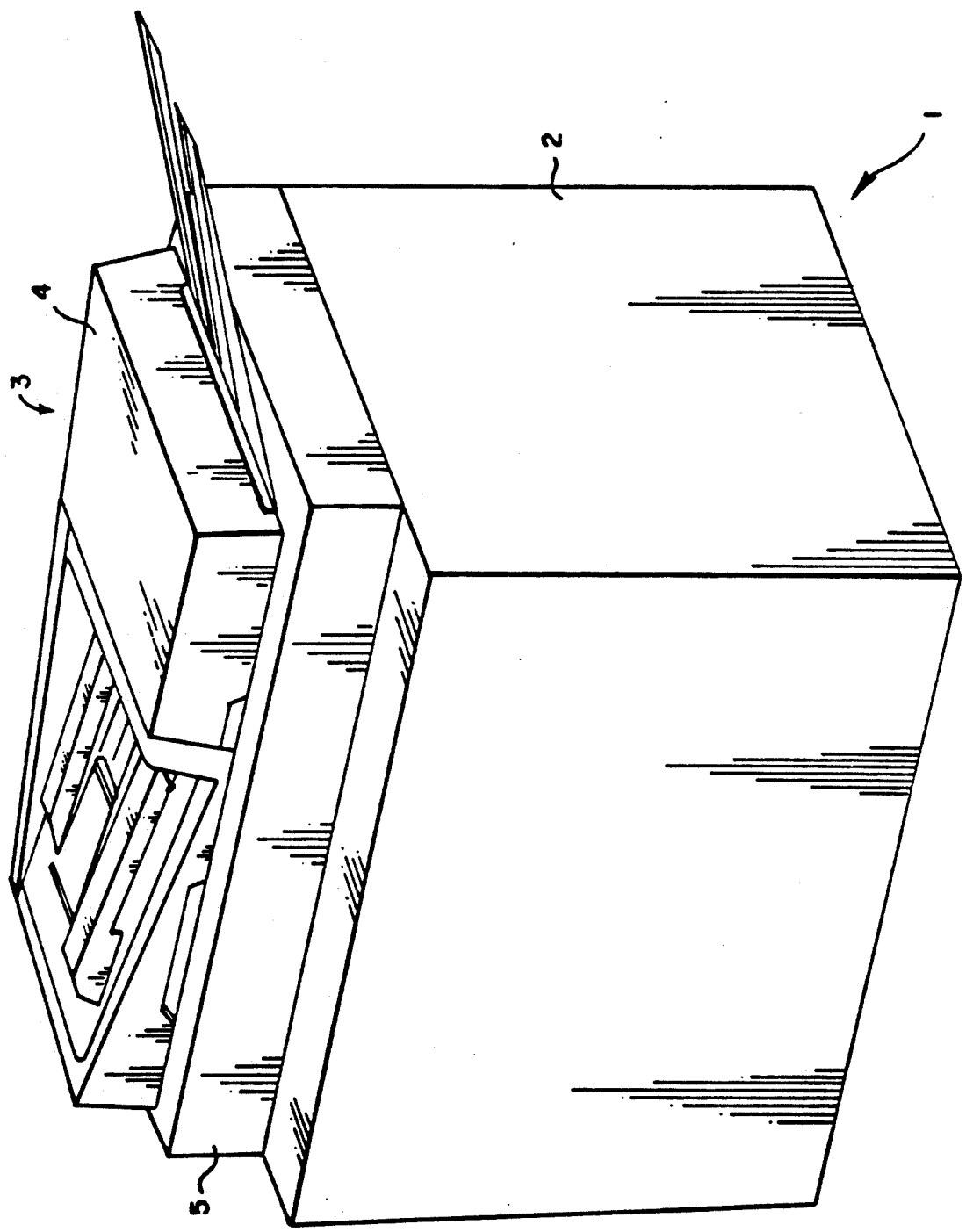
FIG. 1 is a perspective view of a copier which includes an automatic document handler.

According to FIG. 1, a copier 1 is made up of a marking engine 2 and a scanner 3. The scanner 3 includes a document handler 4 and an optical system enclosed in an optics housing 5.

Figure 2:
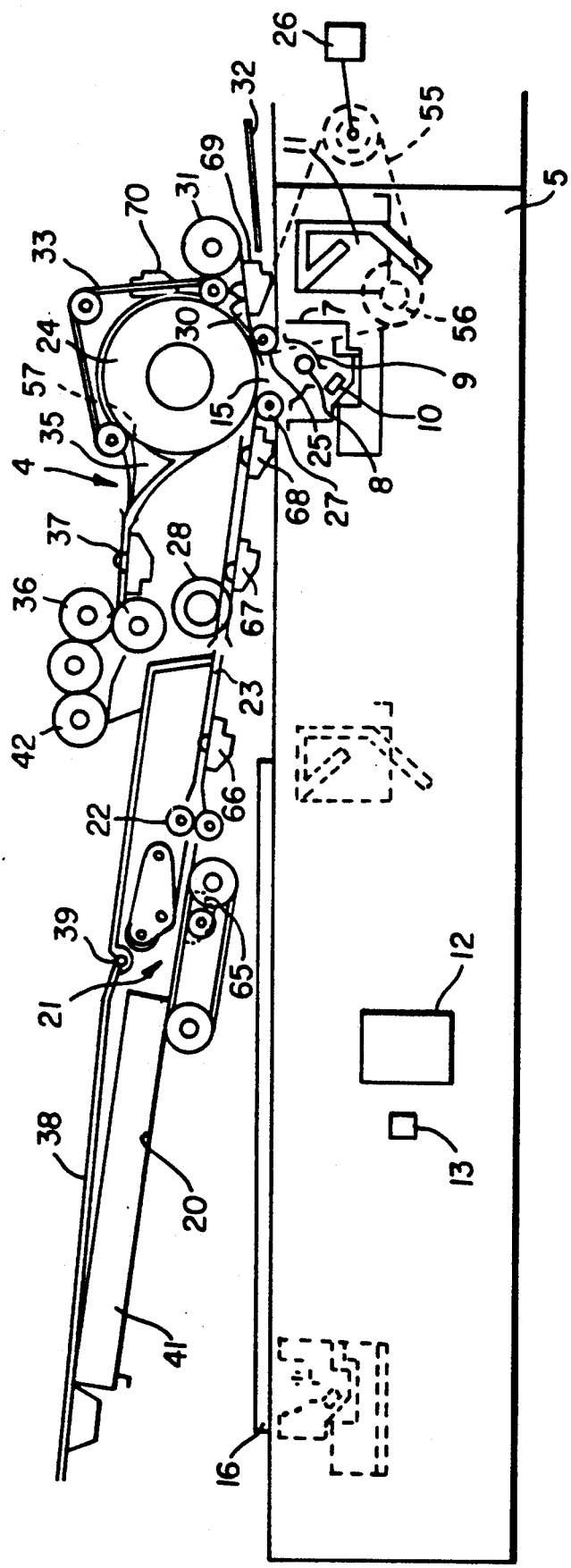
FIG. 2 is a side view of a document feeder and scanner.

Referring to FIG. 2, the optical system includes an illumination head 7 containing an exposure radiation source with an 8, an eliptical reflector 9, and a plane reflector 10. Illumination head 7 cooperates with a pair of movable mirrors 11, an objective 12 and an electro-optical image sensor having separately addressable pixels, for example, a charged coupled device 13. Objective 12 and charged coupled device 13 are stationary while the illumination head and pair of movable mirrors are movable from the position shown in solid lines to the position shown in phantom in FIG. 2.

When illumination head 7 is located in the position shown in solid lines in FIG. 2, it is positioned to project onto charged coupled device 13 an image of a moving document presented by document handler 4 to an exposure position 15. Illumination head 7 and mirrors 11 are movable by a pulley system, not shown, to scan an image of a document or other object placed on an exposure platen 16 onto charged coupled device 13.

Document handler 4 includes a document supply or input tray 20 into which a multisheet (or single sheet) document is placed face down. Document sheets are fed one at a time from the bottom of the stack by a scuff separating device 21. Input tray 20 is inclined approximately seven degrees from the horizontal to gain the assistance of gravity in the separating process. Documents separated from the stack are fed by a pair of feed rollers 22 along an input path 23, defined by registration guides and having a registration roller 28 to a turnover drum 24. Turnover drum 24 is driven by drum drive rollers 25 and 27 which in turn are driven through a suitable clutch by a drive belt 55 driven by a motor 26. Drive belt 55 also drives a pulley 56, through a suitable clutch, which in turn drives the pulley system, mentioned above, for moving the optical components during platen mode copying. The document is fed across exposure position 15 by the combined action of drum drive rollers 25 and 27 driving both the document and turnover drum 24. Turnover drum 24 is held tight against drum drive rollers 25 and 27 to assure location of the document in the object plane of objective 12.

If only one side of the document is to be scanned, a separator or diverter 30 is moved to a raised position which strips the document from turnover drum 24 and allows it to be fed by a simplex exit roller 31 on a shaft 8 into a simplex exit tray 32. Because the documents are placed face down in document input tray 20 and are fed in that position across exposure position 15 and into the simplex exit tray, and new documents are fed into the simplex exit tray on top of preceding documents, the stack of documents in the simplex exit tray ends up in the same order and orientation as in document input tray 20.

If both sides of the document are to be scanned, diverter 30 is placed in its down position allowing the document to follow turnover drum 24. The document is held to turnover drum 24 positively by a set of belts 33 which are driven by turnover drum 24. Belts 33 also drive simplex exit roller 31 thereby maintaining constant velocity of the document in the simplex mode. In the duplex mode, the document is separated from turnover drum 24 by a passive diverter 35 which directs the document into a turnaround path and between reversing rollers 36.

The reversing rollers are driven by separate means, for example, a reversible motor, not shown, and drive the document to the left as shown in FIG. 2 until the trailing edge of the document passes a sensor 37. The sensor sends a signal to the drive means for reversing rollers 36, reversing the rotation of the rollers and feeding the document back to the right along the turnaround path.

Passive diverter 35 now directs the document downward, between rollers 25 and 27 and across exposure position 15 for exposure of the reverse side. As the reverse side is exposed, diverter 30 stays in the downward position allowing the document to once again continue with turnover drum 24 until directed by passive diverter 35 to feed back along the turnaround path to the reversing rollers 36. This time, reversing rollers 36, assisted by an additional duplex exit roller 42, driven by reversing rollers 36, continue to drive the document along this path until it is completely deposited into a duplex exit tray 38. A stack of duplex documents fed through this path will be stacked in duplex exit tray 38 in the same order and orientation in which they were placed in document input tray 20.

The duplex exit tray has a hinge 39 which allows it to be lifted, permitting access to document input tray 20. The document input tray includes an edge guide 41 which is adjustable to assure proper location of the multipage document against a fixed edge guide not shown. Adjustable edge guide 41 may also be connectable by means not shown to the logic and control of the apparatus to input the size of the original document being scanned for purposes of automatic choice of magnification, copy sheet size and the like. Alternatively, a set of document sheet size sensors may be incorporated into the input tray for determining paper length and/or width, or one or both of these dimensions may be determined from the signal from charge coupled device 13. These approaches may be combined, for example, by using sensors or edge guide 41 to determine cross-track size and the charge coupled device signal to determine in-track size.

Movement of turnover drum 24 parallel to its axis is prevented by a set of blades 57 formed on passive diverter 35 which extend into recesses in the drum.

In operation, a stack of document sheets is placed face down in supply tray 20 and the bottom sheet of the stack is fed toward drive rollers 22.

The document handler portion 4 contains a number of sensing devices 65, 66, 67, 68, 69 and 70 in addition to previously mentioned sensing device 37. These devices are generally placed at strategic points to detect either the front edge, the rear edge of a document or the lack of either at the right time, to actuate the various components downstream from those sensing devices or signal that a jam has occurred.

Additional features and disclosure relating to the automatic document handler can be found in co-assigned U.S. Pat. No. 4,844,435 which issued to Griannetti et al. on Jul. 4, 1989; the disclosure of which is specifically incorporated herein by reference.

Figure 3:
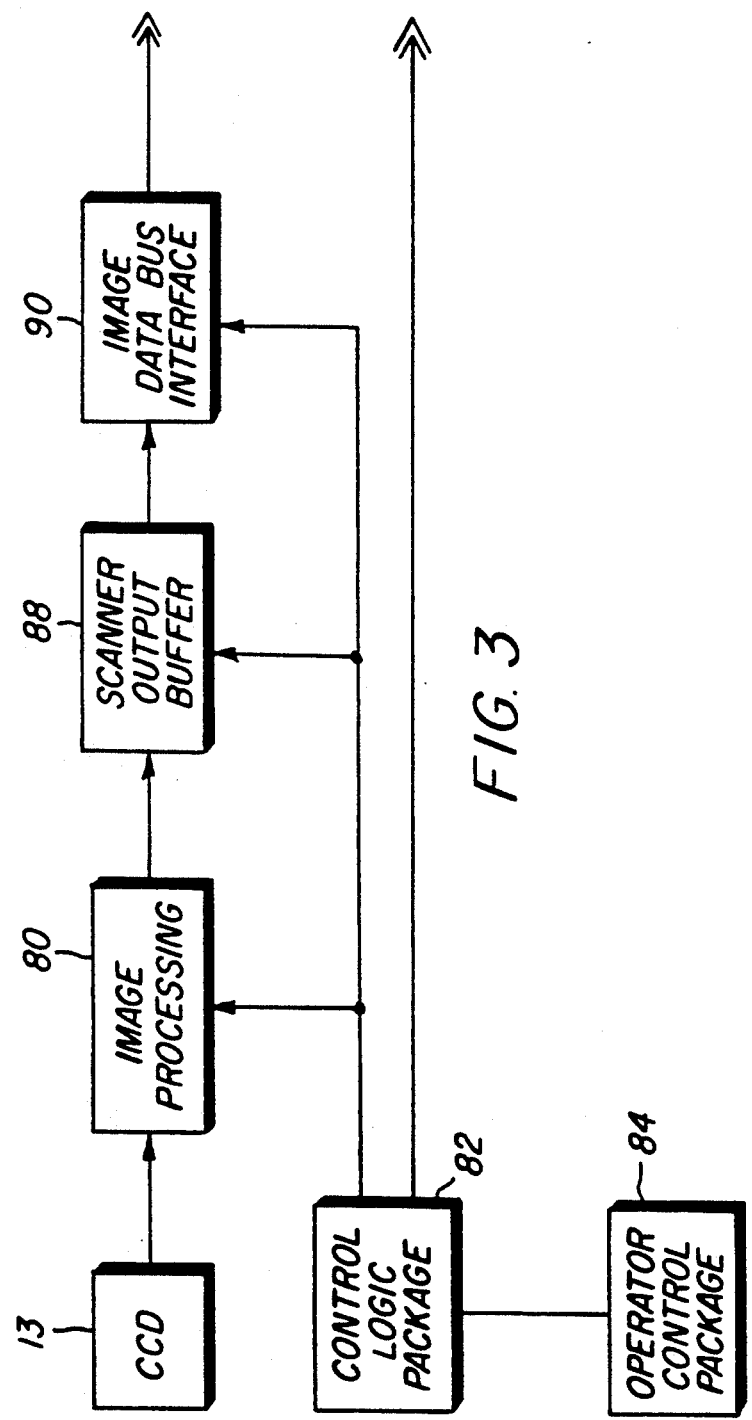
FIG. 3 is a schematic block diagram of the scanner of FIG. 1.

Referring to FIG. 3, charge coupled device 13 converts the image of an original document into a series of electrical signals having values representative of the image density at associated pixel areas on the original document. The image data may be manipulated by image processing electronics 80 for linearity correction, edge enhancement, unsharp masking, image editing, windowing, document recognition, magnification, accent color, color substitution, and so on.

Scanner 3 also includes a control logic package 82 having an operator control panel 84. The operator control panel is interfacing media for the operator to input instruction and to receive messages from the reproduction apparatus. Instructions inputted by the operator at the control panel include machine functions such a collate versus non-collate, stapled copies, the number of copy sets, folded copies, etc.

The logic package consists of control software, interface software, and logic hardware; and is a digital computer, preferably a microprocessor. Programming of a number of commercially available microprocessors is a conventional skill well understood in the art. This disclosure is written to enable a programmer having ordinary skill in the art to produce an appropriate control program for the microprocessor. The particular details of any such program would, of course, depend on the architecture of the designated microprocessor. Control information is transmitted to various image boards in scanner 3 via a parameter bus.

The image has is digitized and formed into a bit map which is stored in a scanner output buffer 88. The scanner output buffer preferably has a one or two page capacity. The processed image data is transmitted through an image data bus interface 90 to marking engine 2.

Syncronization signals to identify separate scan lines and to provide page information and marking engine control, as well as information for finishing and processing of jobs will be sent to marking engine 2 via a job control communications link 92.

Figure 4:
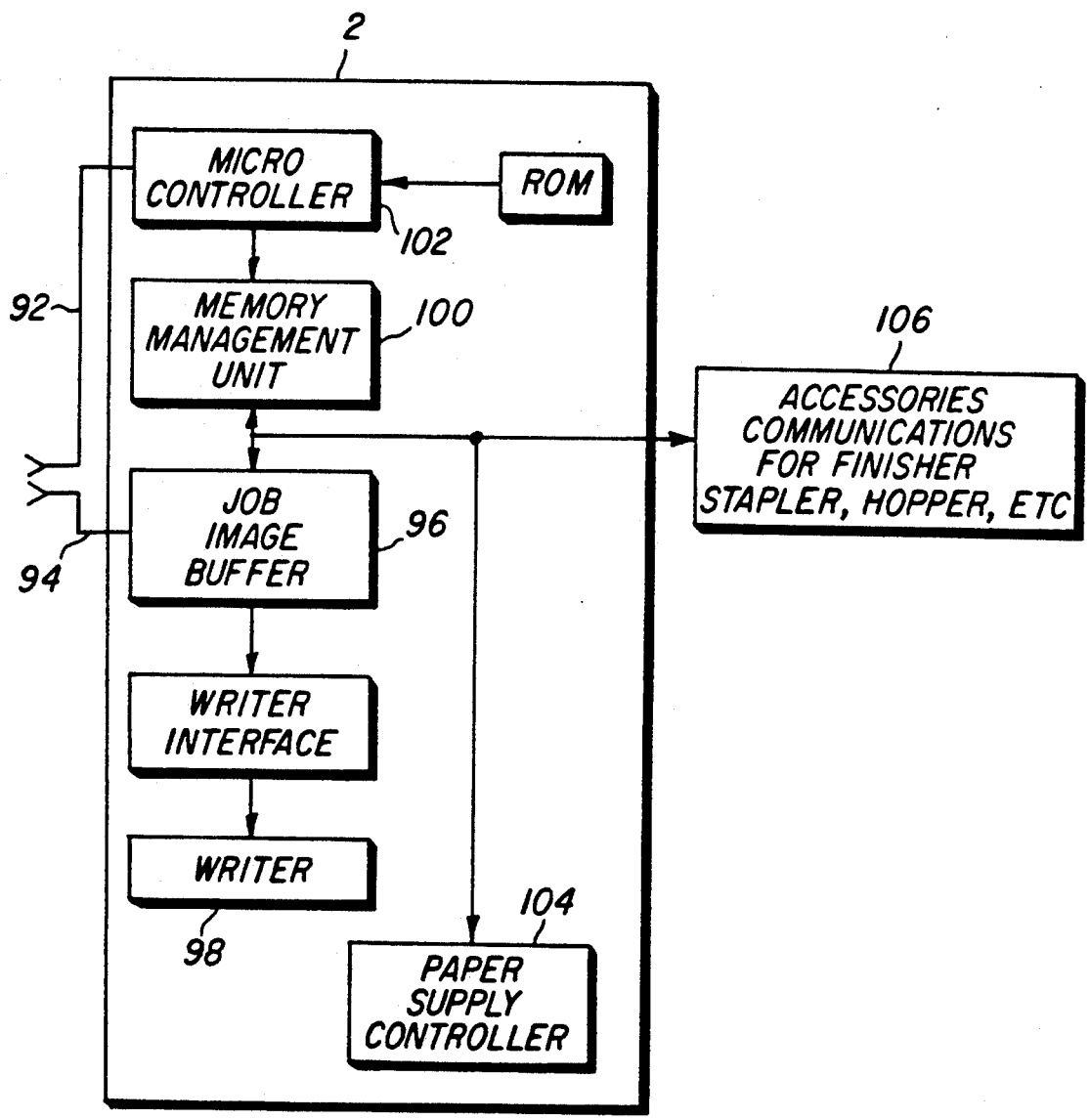
FIG. 4 is a schematic block diagram of the copier of FIG. 1.

Referring to FIG. 4, marking engine 2 receives bit stream image data over an image data bus 94 and job control data over communications link 92, both for storage in a job image buffer memory 96, which is a multiple page memory. The job image buffer will accept electronic image data from scanner 3 and store that data until needed by a writer 98. The storage medium is preferably a dynamic random access memory under the control of a memory management unit 100.

Control means, including a micro controller 102 is arranged to perform arithmetic and logic operations and instruction decoding as well as controlling the time allocation of peripherals (such as a paper supply controller 104 and accessories 106). Several output functions may be available for receiver sheets, including selection of output trays, stapling, sorting, folding, finishing, mailbox, envelope receiver, etc.

As an example of the functions of the elements so far described, it will be assumed that an operator desires to make eight sets of collated copies of a, say, twenty page original document stacked in automatic document handler 4. The operator sets control panel 84 accordingly. For purposes of this example, it will further be assumed that job image buffer 96 is fully capable of storing the information from at least the twenty pages of the original document.

Now, control logic package 82 starts in a subroutine pre-programmed according to the switches on control panel 84 to command scanner 3 to begin operation. Automatic document handler 4 is activated to move a page of the original document into the exposure station.

As the scanning progresses, data (including image information and control signals) are received by job image buffer memory 96. As subsequent pages of the original document are scanned, the processes described above are repeated until a signal is received from control logic package 82 that the last page in document input tray 20 has been scanned and that the data therefrom have been stored in job image buffer 96.

Micro controller 64 is pre-programmed with the capacity of job image buffer 96 and with a bookkeeping function to keep track of the data loaded into the memory. Document scanning will be interrupted if the job image buffer is full.

If an operator wishes to copy an original document which exceeds the capacity of document input tray 20, a mode can be selected to automatically stop the feeder before the end of the set to allow the operator to add more original document sheets to the input tray. The only limitation to the number of original document sheets is the size of job image buffer 96.

Figure 5A:
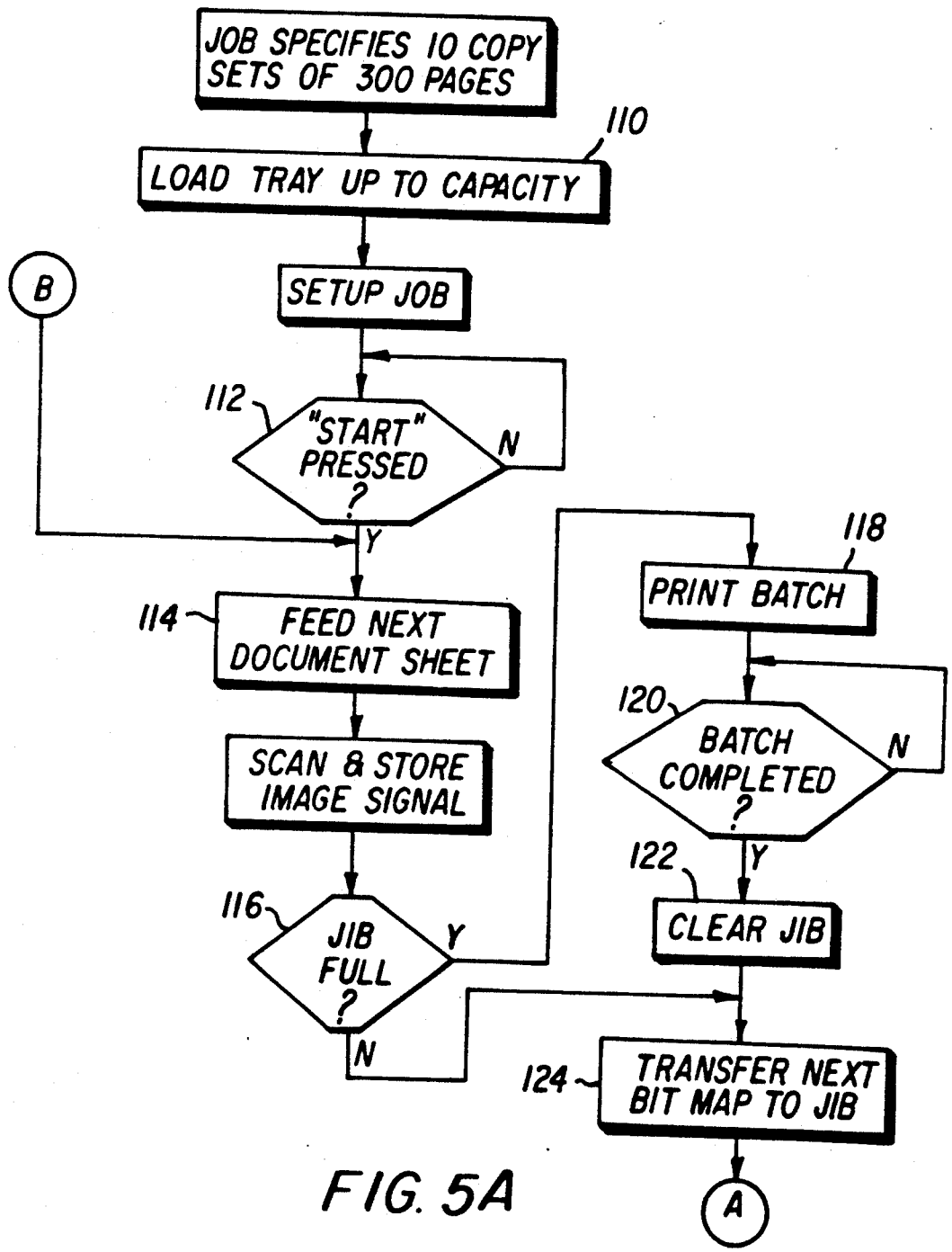
FIGS. 5A and 5B are logic flow charts showing the operation of the copier of FIG. 1.
Figure 5B:
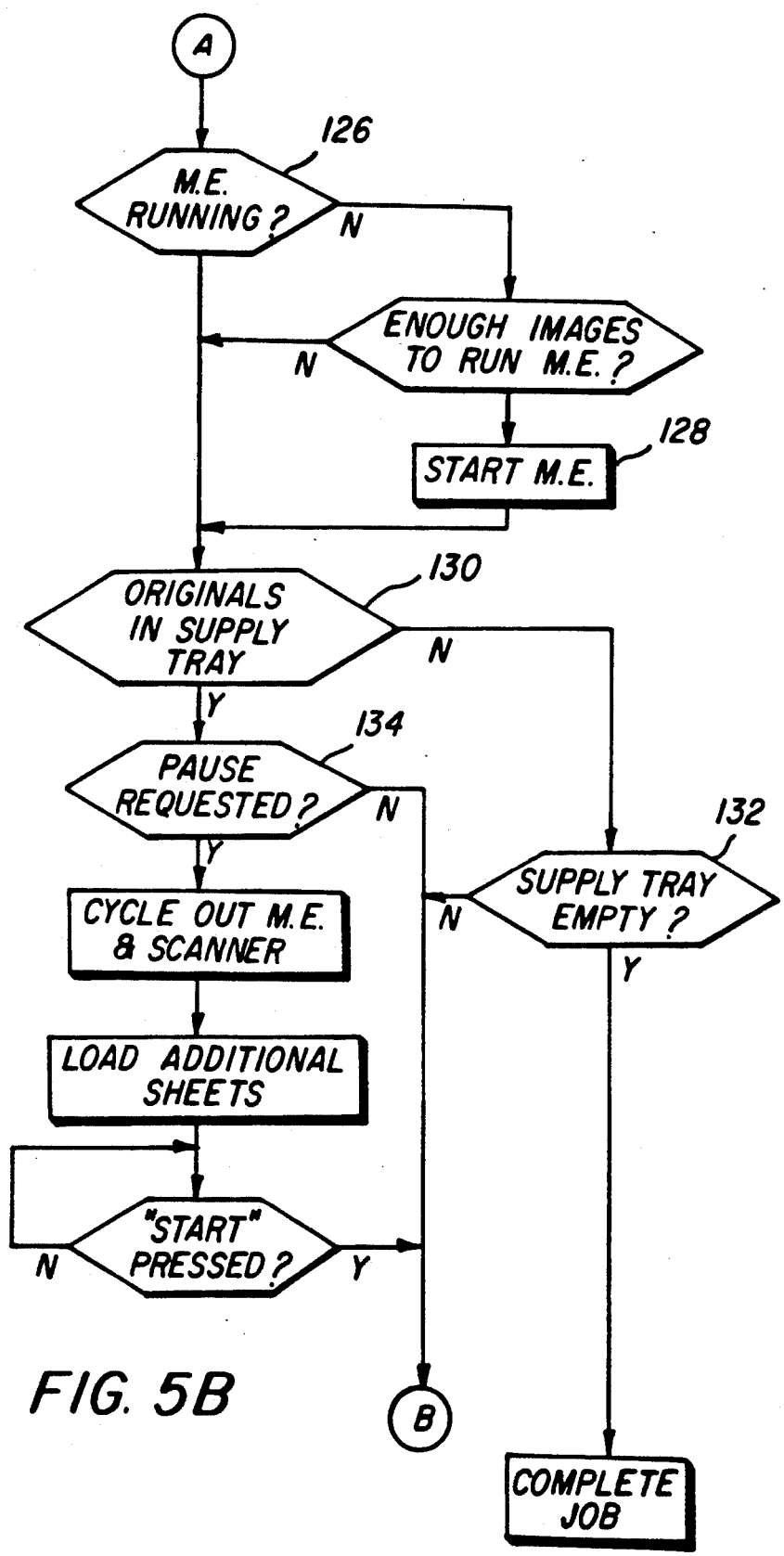

FIGS. 5A and 5B illustrate a logic flow chart of a hypothetical job, requesting ten collated copy sets of 300 original document pages. Assuming that supply or input tray 20 has a fifty sheet capacity, the operator puts the first fifty or less sheets of the original document into the tray (logic block 110), sets up the job parameters, and presses START (logic block 112).

The automatic document feeder advances the first sheet from tray 20 (logic block 114), and the sheet is scanned. The image signal is digitized and stored in scanner output buffer 88. If at that time job image buffer 96 is full (decision block 116), scanner 3 will cycle out and the marking engine will complete a batch based on the bit maps already stored in the job image buffer (logic block 118). Once the batch is completed (120), the job image buffer is cleared (122) and bit map transfer to the job image buffer is resumed (124).

Referring now to FIG. 5B, if the marking engine is not running as determined by decision block 126, and if there are enough images stored in the job image buffer, the marking engine is started (logic block 128).

Decision block 130 tests for the presence of at least one, and less than a predetermined number "n" of sheets in the supply tray. If the tray is empty, as determined by decision block 132, the automatic document handler and scanner are cycled out, the job is completed, and the job image buffer is cleared for the next job. If the tray contains more than "n" sheets, the logic returns to block 114 to feed the next document sheet.

Had the decision at block 130 been positive (implying that there was but a very few sheets left in the document handler tray), and if the operator had pre-set the apparatus to pause under these conditions (decision block 134), the marking engine and scanner will be caused to cycle out by effecting a so called "soft shutdown." Now the operator has an opportunity to load additional original document sheets into supply tray 20. When the "start" button is pressed, the logic returns to block 114 to feed the next document sheet.

Accordingly, the present invention provides a device, of the type having an automatic document handler which denotes the last sheet in the supply or input tray as the last sheet of a job, with the capability of receiving jobs whose number of document sheets exceed the capacity of the document feeder.

The invention has been described in detail with particular reference to preferred embodiments thereof, but it will be understood that variations and modifications can be effected within the spirit and scope of the invention.

What is claimed is:

1. Apparatus comprising:
   an automatic document handler having means for receiving a predetermined maximum number of document sheets, said automatic document handler being adapted to feed received document sheets seriatim from the receiving means;
   control means for causing said automatic document handler to stop feeding document sheets whenever there is less than a predetermined number greater than one of unfed sheets in the receiving means, whereby an operator can place additional sheets in the receiving means while the automatic document handler has stopped feeding sheets; and
   job processing means for treating the last sheet fed from the receiving means when there are no unfed sheets remaining in the receiving means in a received stack, and all preceding sheets fed from the receiving means, as a job.

2. Apparatus comprising an automatic document handler having means for receiving a stock of a predetermined maximum number of document sheets, said automatic document handler being adapted to feed received document sheets seriatim from the stack;
   control means for causing said automatic document handler to stop feeding document sheets whenever there is less than a predetermined number greater than one of unfed sheets in the receiving means, whereby an operator can place additional sheets in the receiving means; and
   means for disabling said control means, whereby all received sheets are fed by said automatic document handler without stopping.

3. A document copier having a copy finisher which operates on complete copy sets of a multisheet original document, said copier comprising:
   an exposure station;
   an automatic document handler having means for receiving a multisheet original document and for feeding sheets of the received multisheet original document seriatim to the exposure station; and
   control means for causing said automatic document handler to automatically stop feeding said sheets whenever there is less than a predetermined number greater than one of unfed sheets of the received multisheet original document remaining.

4. A document copier as defined in claim 3 further comprising selectively operable means for reinitiating sheet feeding.

5. A document copier as defined in claim 3 further comprising means for disabling said control means, whereby all sheets of a received multisheet original document are fed by said automatic document handler without stopping.

6. A document copier as defined in claim 3 wherein said job processing means comprises means for detecting the feed of a last sheet from the receiving means.

7. A document copier having an automatic document handler for feeding a stack of sheets seriatim from a sheet supply to an exposure station, said copier comprising:

scanner means for converting images on the sheets to electrical signals;

buffer means for storing the electrical signals for a plurality of sheets;

control means for producing at least one copy set from the electrical signals stored in said buffer means for a plurality of sheets; and means for interrupting the feeding operation of the document handler when the number of unfed sheets falls below a predetermined number greater than one.

8. A copier as defined in claim 7 further comprising means for selectively disabling said interrupting means.

* * * * *